(12) United States Patent
Chiu et al.

(10) Patent No.: US 8,749,587 B2
(45) Date of Patent: Jun. 10, 2014

(54) SYSTEM AND METHOD FOR CONTENT BASED AUTOMATIC ZOOMING FOR DOCUMENT VIEWING ON SMALL DISPLAYS

(75) Inventors: Patrick Chiu, Menlo Park, CA (US); Koichi Fujii, Kanagawa (JP); Qiong Liu, Milpitas, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1108 days.

(21) Appl. No.: 12/113,201

(22) Filed: Apr. 30, 2008

(65) Prior Publication Data

US 2009/0189920 A1 Jul. 30, 2009

Related U.S. Application Data

(60) Provisional application No. 61/024,111, filed on Jan. 28, 2008.

(51) Int. Cl.
*G06T 3/40* (2006.01)
(52) U.S. Cl.
USPC .......................................... 345/667
(58) Field of Classification Search
CPC ................... G09G 2340/045; G06T 3/4007
USPC .......................... 345/660, 667, 668
See application file for complete search history.

(56) References Cited

U.S. PATENT DOCUMENTS

2007/0150829 A1   6/2007   Eschbach et al.

OTHER PUBLICATIONS

Lance Good, Benjamin B. Bederson, MarkStefik, and Patrick Baudisch; Automatic Text Reduction for Changing Size Constraints; Apr. 20-25, 2002; CHI 2002 extended abstracts on Human factors in computing systems; pp. 798-799.*
A. M. Darwish, M. S. Bedair, and S.I. Shaheen; Adaptive resampling algorithm for image zooming; Aug. 1997; IEE Proceedings Vision, Image, & Signal Processing, vol. 144, No. 4 , pp. 207-212.*
S. Battiato, G. Gallo, F. Stanco; A locally adaptive zooming algorithm for digital images; Sep. 6, 2002; Image Vision and Computing Journal; vol. 20, issue No. 11, pp. 805-812.*
Patrick Chiu, Koichi Fujii, and Qiong Liu, Content Based Automatic Zooming: Viewing Documents on Small Displays, Oct. 2008, MM '08 in Proceedings of the 16th ACM international conference on Multimedia, pp. 817-820.*
Adobe Reader 7.0 for Symbian OS, Adobe Corp. (2007), http://www.adobe.com/products/acrobat/readerforsymbian.html, retrieved on Aug. 21, 2008.
P. Baudisch et al., Collapse-to-Zoom: Viewing Web Pages on Small Screen Devices by Interactively Removing Irrelevant Content, Proceedings of UIST '04, pp. 91-94, 2004.

(Continued)

*Primary Examiner* — Jeffery A Brier
(74) *Attorney, Agent, or Firm* — Sughrue Mion, PLLC (57) ABSTRACT

Described is a technique for viewing a document page on a small display such as a mobile phone or PDA. The page can come from a scanned document (bitmap image) or an electronic document (text and graphics data plus metadata). The page with text and graphics is segmented into regions. For each region, a scale-distortion function is constructed based on image analysis. During interactive viewing of the document, as the user navigates by moving the viewport around the page, the zoom factor will be automatically adjusted by optimizing the scale-distortion functions of the regions in the viewport.

21 Claims, 7 Drawing Sheets

(56) References Cited

OTHER PUBLICATIONS

L. Denoue, et al., FXPAL-IP-07-006: System and methods for generating automatic and user-controllable movies of presentations on small devices, 2007.
B. Erol, et al., Multimedia Thumbnails for Documents, Proceedings of ACM Multimedia '06, pp. 231-240, 2006.
T. Igarashi, et al., Speed-dependent Automatic Zooming for Browsing Large Documents, Proceedings of UIST '00, pp. 139-148, 2000.
S. Ioffe, Red eye detection with machine learning, Proceedings of ICIP '03, 2003.
M-Y. Wang, et al., MobiPicture—Browsing pictures on mobile devices, Proceedings of ACM Multimedia '03, pp. 106-107, 2003.

* cited by examiner

Figure 1.

Quantum Information Processing

101 whenever a system has two or more possible avenues, it can explore them simultaneously. For a quantum computer, instead of paths of a photon, we might use two orbits of an electron in an atom to represent our quantum bit or qubit. The atom can exist in a superposition of 0 and 1, just as a struck bell can vibrate at two different frequencies simultaneously.

Quantum Parallelism

Qubits are the basic entities on which quantum computers operate, in that quantum computers compute on both values stored in any qubit at the same time. Moreover, N qubits, each in a superposition of 0 and 1, encode $2^N$ values, and a quantum computer can compute on all of these values at once. This massive parallelism, exponential in the number of particles used in the computation, is called quantum parallelism. Any classical circuit has a corresponding quantum circuit [2]. So a quantum computer can make any calculation on all $2^N$ values in roughly the same time that it would take an ordinary computer to compute on a single value.

Entangled particles

The heart of quantum parallelism lies in the fact that quantum superpositions of multiple particles admit strange correlations that have no classical analog. Imagine that Alice and Bob are each given a coin. When Alice and Bob play with their coins individually, the coins appear normal; in particular, tossing each coin gives perfectly random results. However they soon notice that every time Alice's coin lands heads, so does Bob's, and vice versa. Moreover, there is no possible means for communication between the coins. Magic? No, quantum mechanics.

While such correlations are not seen between large, separate objects, including coins, such correlations have been created between elementary particles. Objects correlated in this way are said to be quantum mechanically entangled. Pairs of objects exhibiting such correlations are called EPR pairs after Einstein, Podolsky, and Rosen who first discussed them. The vast majority of possible quantum states contain quantum correlations, and this is responsible for the exponential nature of quantum parallelism and the success of quantum algorithms. It was Richard Feynman's observation that certain types of entanglement could not be efficiently simulated on a classical computer that promoted early interest in the field of quantum computation [3].

The measurement problem

Accessing results obtained using quantum parallelism requires measuring the final state of the qubits. Any instrument used to measure registers a single result, even though the quantum computer may be storing a superposition, possibly huge, of different values. Nature resolves this paradox by wiping out the other values in the superposition whenever any measurement is made, transforming the state from a possibly complex superposition to a simple state consisting of the single value read. For quantum computation, this difficulty in accessing the values is a severe limitation, and highly unconventional programming techniques for finessing the measurement problem, like those of Shor and Grover, are required.

Quantum Algorithms

The trick is to make quantum transformations to the superposition of all the values so that when you measure you are likely to get information you want. Essentially two methods are currently known. The first is measuring a common property of all of the output values, as is done in Shor's algorithm. Another is to amplify the results of interest, as is done in Grover's search algorithm.

The best classical algorithm for factoring large integers takes time which increases superpolynomially with the length of the number, and is thus unworkable for large enough numbers. This fact is used in a variety of encryption schemes, including the widely used RSA algorithm. Shor,

100

---

Quantum key distribution was the first development in quantum information theory likely to have a commercially viable application. A variety of schemes and implementation ideas have been developed. We will describe one found by Charles Bennett and Gilles Brassard [1] building on ideas of Stephen Wiesner. The aim of the distribution scheme is to establish a random secret key, consisting of a sequence of 0's and 1's, that only the two people who wish to communicate know.

SYSTEM AND METHOD FOR CONTENT BASED AUTOMATIC ZOOMING FOR DOCUMENT VIEWING ON SMALL DISPLAYS

FIELD OF THE INVENTION

This invention generally relates to presenting information on information displays and more specifically to using displays of small size to render documents in a form convenient for viewing and navigation by a user.

BACKGROUND OF THE INVENTION

Mobile phones and PDAs are used by numerous people around the world. As these devices become more powerful, they can be platforms for many types of applications. Currently, substantial industry efforts focus on developing methodologies for viewing document pages on a mobile phone, PDA, or a device with a small display.

It is challenging to view and navigate a document effectively on a small display. Typically, the user must manually scroll around and zoom in and out; for example, using applications such as the Adobe Reader 7 for Symbian OS, described in Adobe Reader 7 for Symbian OS, available from Adobe Corp. (2007). However, the viewing process is quite tedious because the user needs to press the scroll and zoom buttons many times. With the Adobe Reader, each zoom operation requires 3 button presses because it is accessed through a menu. To zoom to a user specified scale (e.g. 80%, 125%), it takes 8 or 9 button presses to navigate the menu and enter the scale value on the keypad.

While the user can view the document using a fixed scale that is suitable for comfortable reading of the document's body text, this makes navigation more time consuming when the user has to read text that is larger than the body text (e.g. title and heading text). The reason is that less of the larger text is shown on the display, and more scroll operations are required to move through the larger text.

Thus, the conventional industry approaches are deficient in their ability to facilitate efficient display of information on small information displays for easy viewing and navigation by the user.

SUMMARY OF THE INVENTION

The inventive methodology is directed to methods and systems that substantially obviate one or more of the above and other problems associated with conventional techniques for displaying of documents on small information displays.

In accordance with one aspect of the inventive methodology, there is provided a technique for viewing a document page on a small display such as a mobile phone or PDA. The page can come from a scanned document (bitmap image) or an electronic document (text and graphics data plus metadata). The page with text and graphics is segmented into regions. For each region, a scale-distortion function is constructed based on image analysis. During interactive viewing of the document, as the user navigates by moving the viewport around the page, the zoom factor will be automatically adjusted by optimizing the scale-distortion functions of the regions in the viewport.

In accordance with another aspect of the inventive methodology, there is provided an interactive technique for viewing a document page on a small display. The document page is segmented into regions and an associated scale-distortion function constructed for each region based on its content properties. When the user navigates by moving the display viewport, the scale factor is automatically and continuously changed to optimize the associated scale-distortion functions of those regions visible in the viewport.

In accordance with yet another aspect of the inventive methodology, there is provided an interactive technique for viewing a document page on a small display: when the user navigates by moving the display viewport, the scale factor is automatically and continuously changed to optimize the scale-distortion function of the portion of the page image visible in the viewport.

In accordance with a further aspect of the inventive methodology, there is provided a method involving segmenting a document into a plurality of regions; performing an image analysis for each of the plurality of regions; computing a scale-distortion function for each of the plurality of regions using the image analysis; and automatically adjusting zoom of displayed region of the document by optimizing the scale-distortion function corresponding to the displayed region.

In accordance with yet further aspect of the inventive methodology, there is provided a computer readable medium embodying a set of instructions, the set of instructions, when executed by one or more processors, causing the one or more processors to perform a method involving segmenting a document into a plurality of regions; performing an image analysis for each of the plurality of regions; computing a scale-distortion function for each of the plurality of regions using the image analysis; and automatically adjusting zoom of displayed region of the document by optimizing the scale-distortion function corresponding to the displayed region.

In accordance with still further aspect of the inventive methodology, there is provided a system incorporating a segmentation module operable to segment a document into a plurality of regions; an image analysis module operable to perform an image analysis for each of the plurality of regions; a computing module operable to compute a scale-distortion function for each of the plurality of regions using the image analysis; and a zoom calculation module operable to automatically adjust zoom of displayed region of the document by optimizing the scale-distortion function corresponding to the displayed region.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Common Zooming Techniques

The popular Adobe Readers support zooming in several ways. On the mobile version (Adobe Reader 7 for Symbian OS, described in Adobe Reader 7 for Symbian OS. Adobe Corp. (2007)), the interaction is quite tedious as mentioned above: the user needs to make many button presses to access the zoom menu commands, or to enter a custom zoom scale.

Automatic Zooming

A research technique for speed-dependent automatic zooming, described in Igarashi, T., Hinckley, K., Speed-dependent automatic zooming for browsing large documents, Proceedings of UIST '00, pp. 139-148 (2000), has been developed. Its application is for browsing a large number of pages, in contrast to our application for viewing the contents of a single page. As the user scrolls faster, the viewport is zoom out so that the flow of the page images or thumbnails perceptually appears to move at a constant rate; this helps mitigate the blurring effect if the viewport is not zoomed out.

U.S. published patent application No. 2007/0150829 describes a method for automatic zooming based on computing a fixed zoom factor for each region of a raster image. The interaction is jumpy, since the zoom factor is changed as the user makes each selection of a section [region]. While it displays surrounding parts of sections for context, it does not address the issue of multiple segments in the viewport.

Automatic Pan and Zoom

Ricoh Multimedia Thumbnails described in Erol, B., Berkner, K., Joshi, S., Multimedia thumbnails for documents, Proceedings of ACM Multimedia '06, pp. 231-24, analyzes electronic or scanned documents to extract document elements and visual focus points, and automatically determines a reading order based on the layout. It synthesizes audio from the text. It generates a pan-and-zoom movie trailer for the document based on the reading order path and audio.

MobiPicture described in Wang, M.-Y., Xie, X., Ma, W. Y., H-J. Zhang, MobiPicture—Browsing pictures on mobile devices (Demo), Proceedings of ACM Multimedia '03, pp. 106-107, is similar to multimedia thumbnails but targeted for pictures. It detects regions of interest within a picture and generates a path, and a pan-and-zoom animation is created.

Collapse-to-Zoom

Collapse-to-zoom technique, described in Baudisch, P., Xie, X., Wang, C., Ma, W.-Y., Collapse-to-zoom: viewing web pages on small screen devices by interactively removing irrelevant content, Proceedings of UIST '04, pp. 91-94 (2004), is a technique for collapsing and expanding regions. The target device is a PDA with a stylus and the domain is Web pages, which often contain uninteresting areas (e.g. advertisement banners, menus, archived content). The user makes a gesture with the stylus; its location and size demarcate the region and its direction defines the operation. The regions are not automatically detected, as in our technique. It also requires a stylus, which most mobile phones lack. Once regions are collapsed, the empty space is taken up by zooming in on the remaining parts of the document.

One embodiment of the invention, content based automatic zooming (CBAZ), is designed to perform intelligent zooming automatically as the user navigates, adjusting the scale depending on which portions of the content is being viewed. By cutting down on the number of manual zoom operations, the viewing experience becomes faster and less tedious. Just as important, since an optimal amount of content is shown on the display, the screen area is more effectively utilized.

Figure 1:
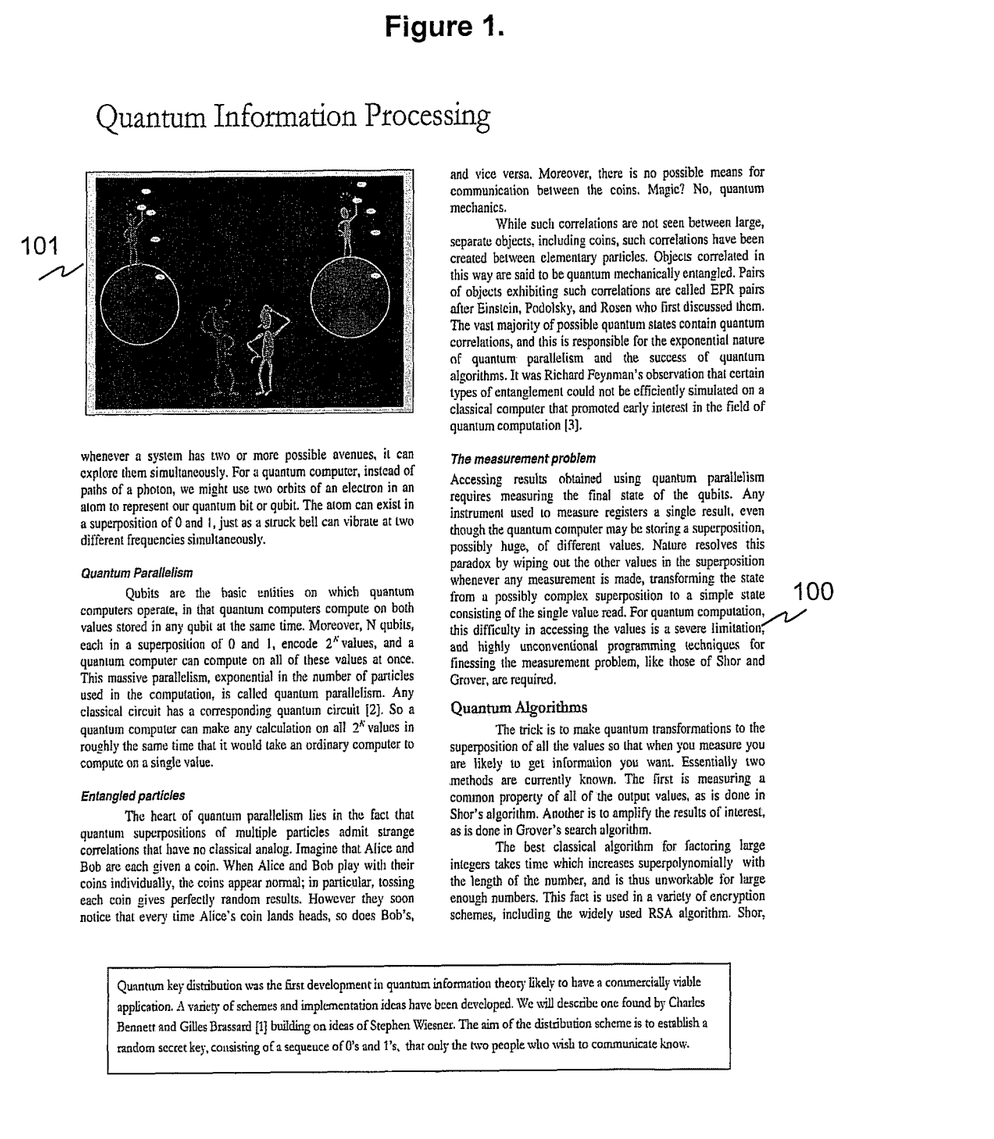
FIG. 1 illustrates a sample document page.
Figure 2:
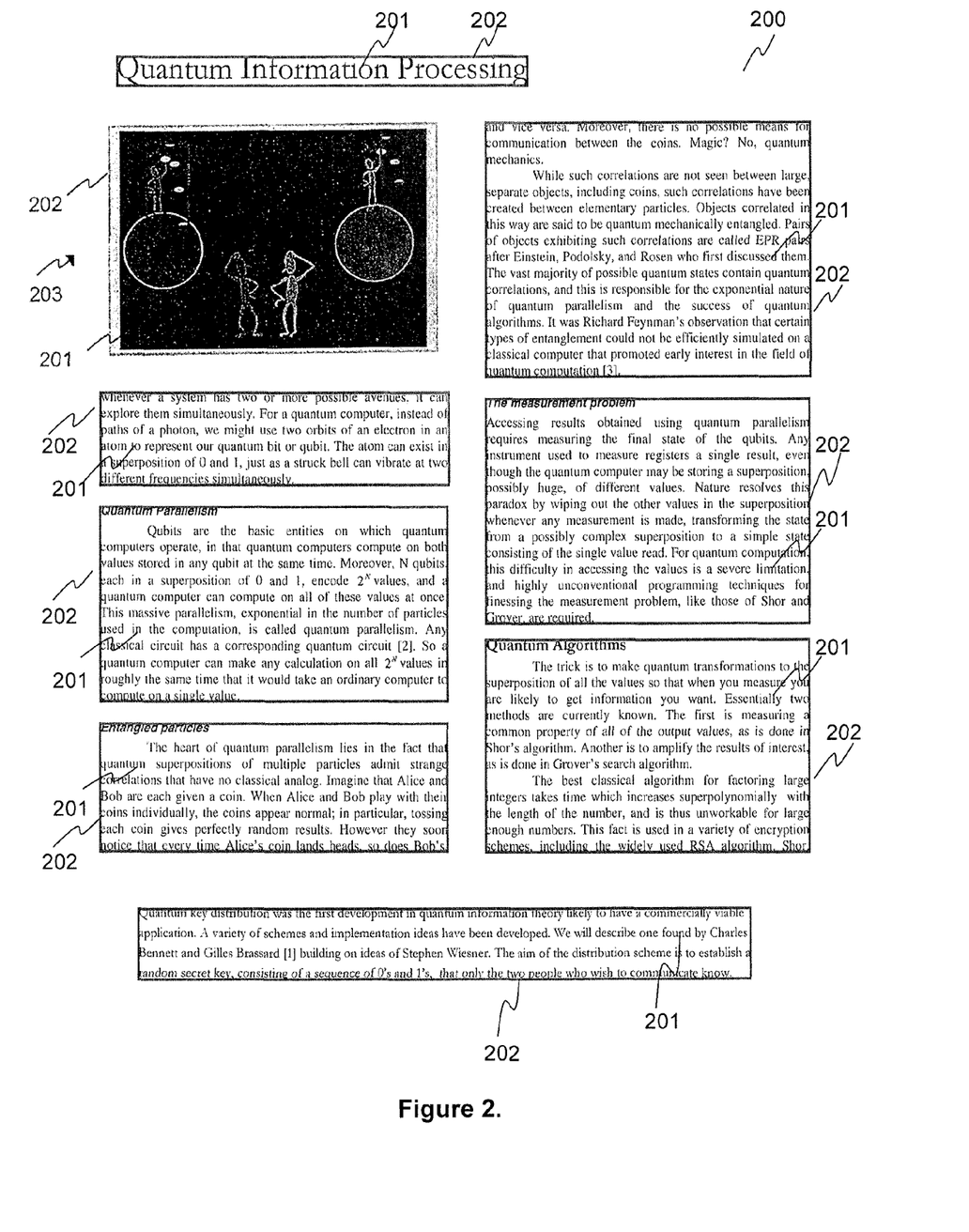
FIG. 2 illustrates an exemplary segmented document page, with rectangles draw around the segments.
Figure 3:
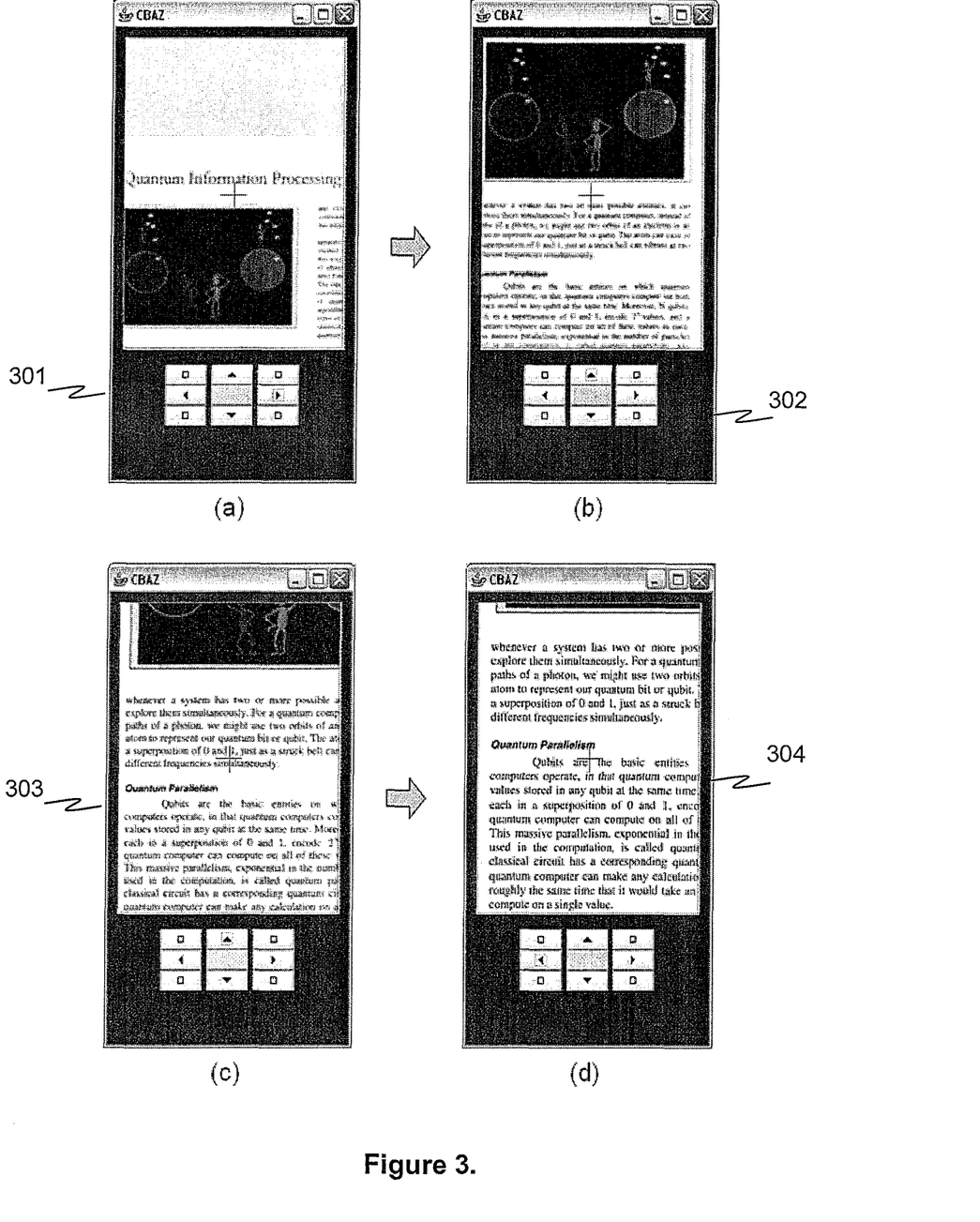
FIG. 3 illustrates viewing a document page using an embodiment of the inventive technique. The zoom factor is automatically adjusted based on optimizing the scale-distortion functions of the segments visible in the viewport. The center of the display is indicated by a cross-hair. The scales are: (a) 0.6, (b) 0.7, (c) 0.9, (d) 1.0.

Viewing a document with the inventive CBAZ method is illustrated in FIGS. 1-3. A document page 100 illustrated in FIG. 1 is segmented into regions 201 shown in FIG. 2. In this figure, rectangles 202 are drawn around each region 201 of the document page 101. For each region 201, a scale-distortion function (not shown) is constructed based on image analysis. When the user navigates by moving the viewport around the page 101, the zoom factor is automatically adjusted by optimizing the aforesaid scale-distortion functions, as shown in FIG. 3. In FIG. 3, the zoom factor of the images 301, 302, 303 and 304 is automatically adjusted based on optimizing the scale-distortion functions of the segments visible in the viewport. The center of the display is indicated by a cross-hair. The scales are: (a) 0.6 for image 301, (b) 0.7 for image 302, (c) 0.9 for image 303, and (d) 1.0 for image 304.

While the user interaction is simplified by the inventive CBAZ method, it would be appreciated by those of skill in the art, that the computer system supporting the CBAZ calculations must do a substantial amount of work. This is especially true for documents that are bitmap images (e.g. scanned documents), where image segmentation algorithms are required to determine the regions on each page. Even for electronic documents (e.g. PDF, Microsoft Office, Web pages, etc.), the regions containing graphics and figures require content analysis computations to model their scale-distortion functions.

The below description is organized as follows: in the next section, the overall system architecture is described. Then, the details of the content analysis, segmentation and classification of regions will be presented and the construction and optimization of scale-distortion functions will be explained.

Technical Details

Figure 5:
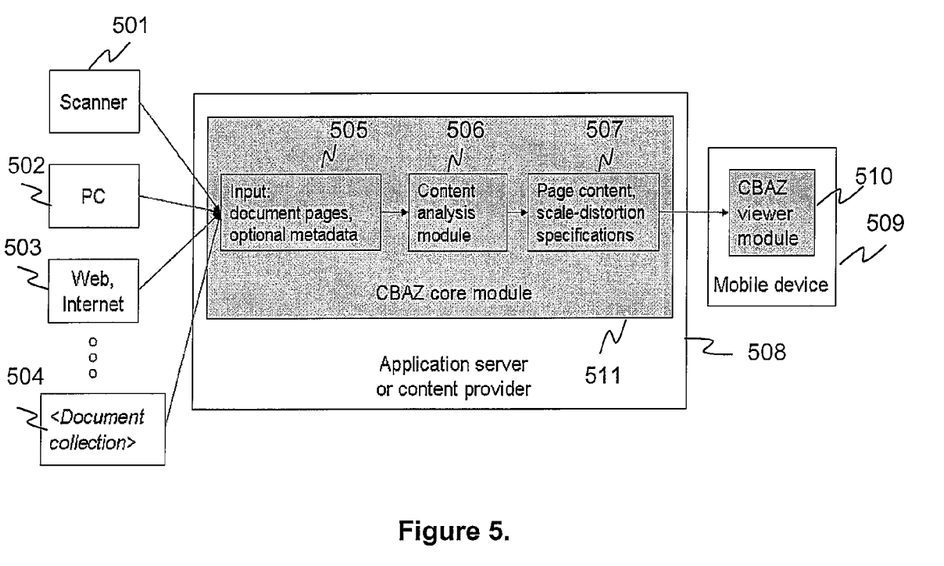
FIG. 5 illustrates an exemplary embodiment of overall system architecture.

An overview of the system architecture is given in FIG. 5. The document for display may be obtained using a scanner 501, a PC 502, Web or Internet 503, or a document collection 504. The input 505 may include document pages, which may be in a form of bitmap images (e.g. images from the scanner 501) or be in a form of electronic content together with optional metadata. The aforesaid metadata can include descriptors for the layout, including region bounding boxes; the metadata can also describe the content such as the font properties of text or graphics properties of figures.

In an embodiment of the invention, the inventive CBAZ core module may be integrated with an application server or a content provider. An embodiment of the inventive system may include a content analysis module that computes the page regions and scale-distortion functions. The application server or content provider may package the page content with the scale-distortion specifications for sending to the mobile device 509.

In one embodiment of the invention, in the mobile device, the inventive CBAZ viewer module supports interactive document viewing. It performs the optimization of the scale-distortion functions and automatic zooming as the user navigates the viewport over the document on the screen.

Content Analysis

Figure 6:
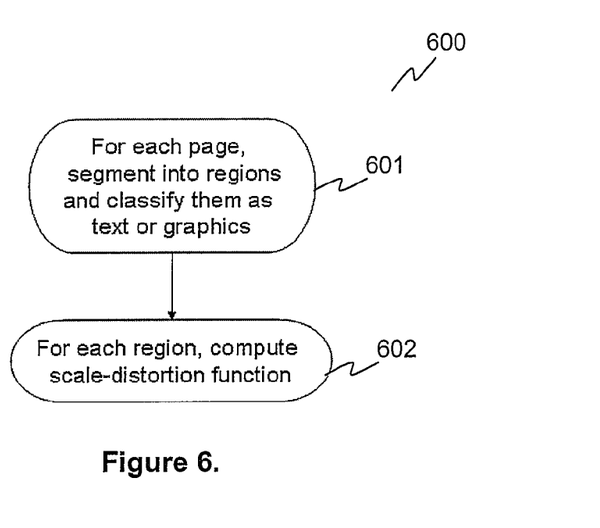
FIG. 6 illustrates an exemplary embodiment of an algorithm for content analysis.

FIG. 6 illustrates an exemplary embodiment of an algorithm 600 for content analysis. In an embodiment of the invention, this algorithm is performed by the content analysis module 506 shown in FIG. 5. At step 601, the content analysis module 506 segments the document pages into multiple regions 201, as shown, for example in FIG. 2. In the example shown in that figure, the document is segmented into multiple regions 201. Each of the aforesaid multiple regions 201 is then classified based on whether it contains text or graphics, see step 601. For each such region 201, a scale-distortion function is computed at step 602. Below, the aforesaid steps will be described in detail.

Segmentation and Classification of Regions

Figure 7:
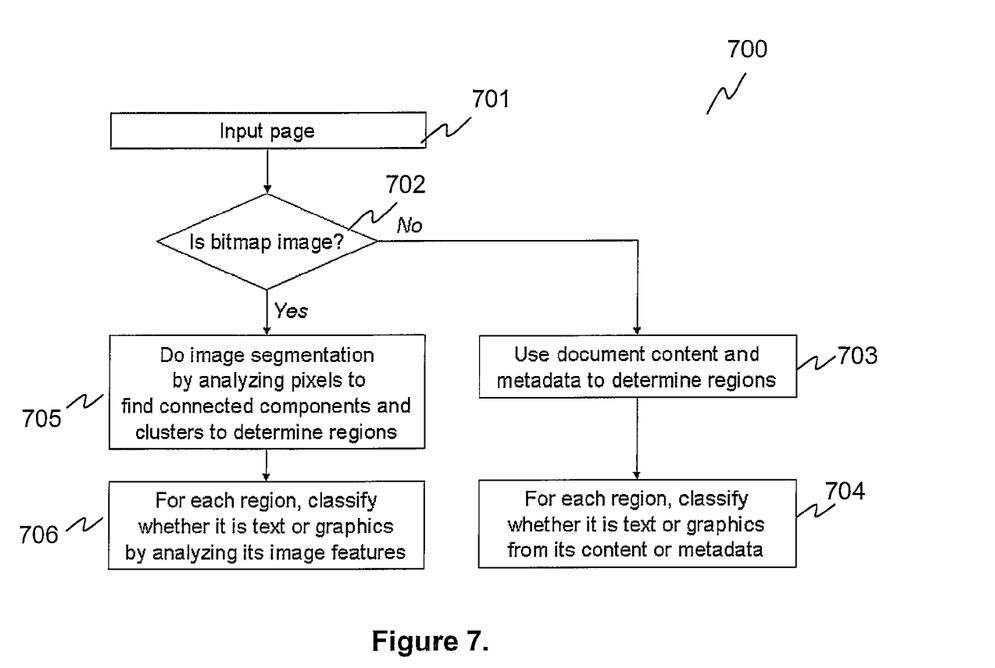
FIG. 7 illustrates an exemplary embodiment of an algorithm for segmentation and classification of regions.

FIG. 7 illustrates an exemplary embodiment of an algorithm 700 for segmentation and classification of regions. At step 701 the page to be display is being input. It should be noted that the input page is handled differently depending on whether it is a bitmap image (e.g. from a scanner) or data and metadata (e.g. an electronic document like PDF, Microsoft Office, Web pages, etc.). To this end, at step 702, a determination is made as to whether or not the page input at step 701 is a bitmap image. For an electronic document, the segmentation is relatively easy because the metadata, in particular the layout description, can be used. The electronic document content and metadata are being used to determine the segmentation regions at step 703. The classification of text and graphics regions can also be obtained from the content and/or the metadata, see step 704.

For a bitmap image page, the segmentation is performed by analyzing the pixels of the image, see step 705. This can be achieved by finding connected components and clusters to determine the regions. For example, FIG. 1 shows sample image 101 and the corresponding segmentation result 203 is shown in FIG. 2.

To classify whether a region incorporates text or graphics, the image features are analyzed at step 706. In an embodiment of the invention, the classification is performed in the following way. First, the bitmap image is preprocessed using binarization. Next, the connected components are extracted. This can be achieved by a labeling technique. For each component, properties such as bounding box size, aspect ratio, density, and the like are calculated. After that, the class of each connected component is determined according to its properties. Because a region is a cluster of components, the region can be classified based on the properties of its components; e.g. a cluster of "character" components is classified as a "text" region. Non-text regions can be classified as "graphics" regions.

A type of graphics region that is of special interest is a photo containing faces. Current technology can detect faces fairly reliably, as described, for example, in Ioffe, S, Red eye detection with machine learning, Proceedings of ICIP '03 (2003). Techniques for face detection are well known to persons of skill in the art. Thus, an embodiment of the inventive system incorporates a human face detection module configured to detect faces in the images and classify the corresponding images accordingly.

Computing the Scale-Distortion Function of a Region

For each region 201, a scale-distortion function (or scd-function for short) is computed by the content analysis module 506. The scd-function characterizes how the distortion changes as the scale changes for the region. The page content together with the scale-distortion specifications 507 are output by the content analysis module 506, see FIG. 5.

In an embodiment of the invention, the scd-function $y=f(x)$ is computed as follows. First, a set of sample points is produced by computing the distortion on a sequence of x-values or scales. From the sample points, a linear interpolation is performed, which can be a polynomial interpolation, or other well known forms of interpolation such as splines.

Figure 4:
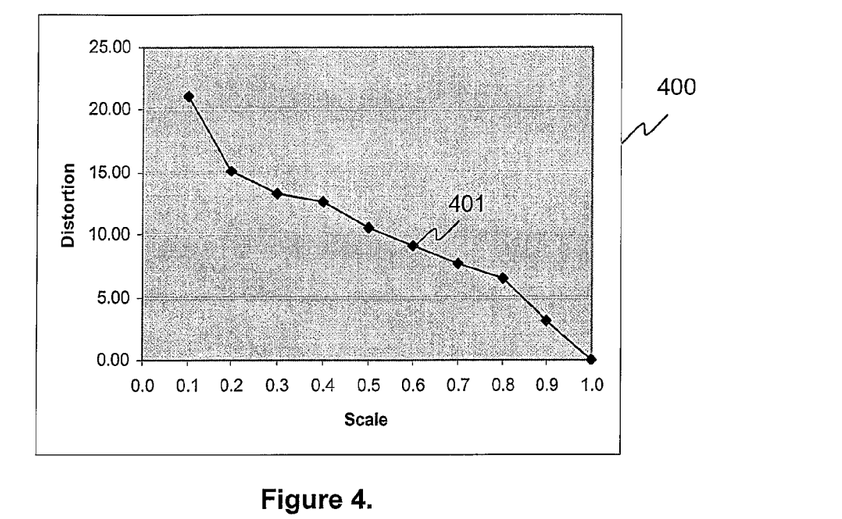
FIG. 4 illustrates an exemplary graph of a scale-distortion function, corresponds to the image segment 203 in FIG. 2.

For example, using the region 203 of the figure in the upper left part of the page in FIG. 2, the distortion values for a set of scales $x=\{0.1, 0.2, 0.3, \ldots, 1.0\}$ are computed. Next, for each x, a scaled image is constructed by scaling the reference region image by x. Then, the distortion is defined to be the square root of the sum of squares of the pixel values in the reference image to the corresponding pixel values in the scaled image. A graph 400 of this scale-distortion function 401 is shown in FIG. 4.

In one embodiment of the invention, each pixel of the reference image corresponds to multiple pixels in a scaled down image (e.g. for $x=0.5$, each pixel in reference image is mapped to four pixels in the scaled down image). Also, the distortion values are normalized by dividing by the number of pixels in the reference region. For determining the difference between pixels, one can use the difference in luminance value, the difference in RGB value as 3D vectors, or some other measure of difference in pixel features.

Computing the Scale Factor for Viewport

Figure 8:
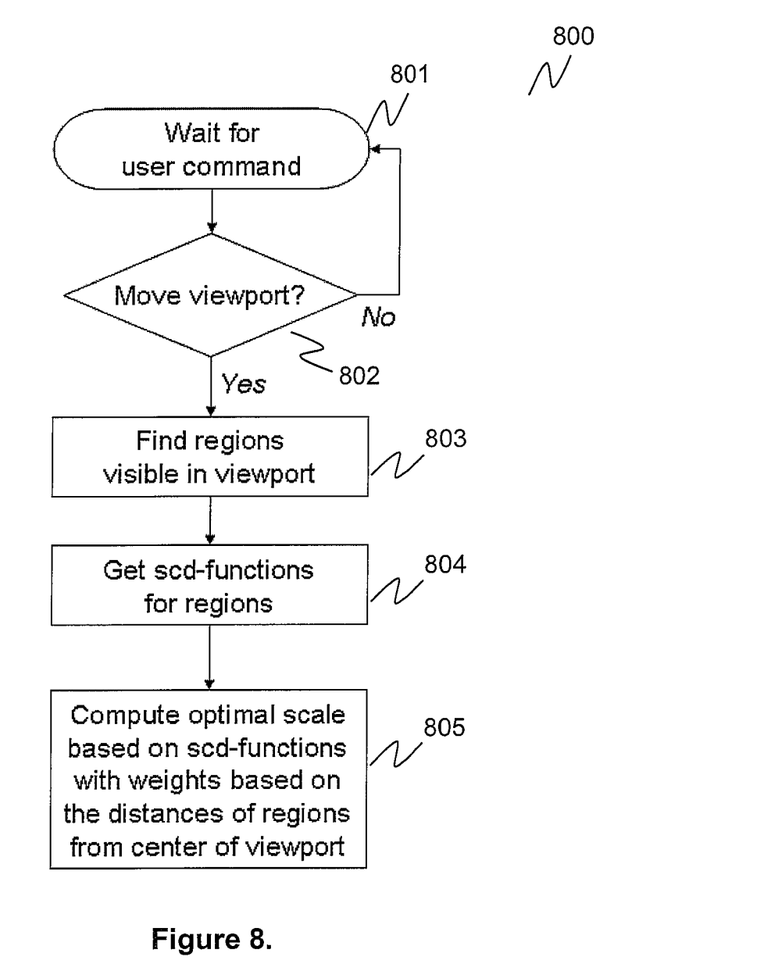
FIG. 8 illustrates an exemplary embodiment of an algorithm for computing zoom factor for viewport.

In an embodiment of the invention, as the user navigates by moving the viewport around the document page, various regions become visible to the user. The viewport scale is adjusted automatically by taking into account the aforesaid regions in the viewport. Using the scd-functions of these regions with weights based on the distances from these regions to the viewport center, an embodiment of the inventive system computes an optimal scale value. An exemplary embodiment of this interactive process 800 for computing zoom factor for a viewport is illustrated in FIG. 8.

Specifically, at step 801, the system waits for the user to issue a command. At step 802, the system determines whether the user has issued a command to move the viewport. If not, the system repeats the steps 801 and 802. If the viewport move command has been received, the system finds regions visible in viewport at step 803. At step 804, the system computes the scd-functions for the found regions. After, that, at step 805, the optimal scale is computed based on the scd-functions with weights based on the distances of respective regions from the center of the viewport.

One embodiment of the invention utilizes a method that uses a simple formula described below. In that embodiment, the scd-functions are modeled by linear or polynomial interpolation of the sample points. Thus, for M regions and polynomial interpolation of order n, an scd-function is given by:

$$y_i = f_i(x) = a_{i0} + a_{i1}x + a_{i2}x^2 + \ldots + a_{in}x^n, i=0,1,2,\ldots,M-1.$$

For each $f_i(x)$, a cutoff value $x_i^*$ is determined. In an embodiment of the invention, this is done based on a threshold of distortion loss. The cutoff value is defined to be the x-value at which $f_i(x)$ crosses the threshold. Heuristically, the cutoff value is the scale that optimizes the viewing of the i-th region in the viewport. As would be appreciated by persons of skill in the art, the threshold will depend on the display resolution and pixel density.

In an embodiment of the invention, the cutoff value can also make use of the features for the specific type of region: font size for text region, face size for an image region with faces, etc. For example, in the case of text, the cutoff value is the scale value x that optimizes displaying the font in the text region. This again depends on the display resolution and pixel density.

For the weights, $w_i$ is defined to be the inverse square of the distance from the i-th region to the center of the viewport. The distance metric is normalized by dividing by the radius of the display. Then, the first order solution to the optimal scale factor is given by the formula:

$$x = \frac{\sum_{0 \le i < M} w_i a_{i1} x_i^*}{\sum_{0 \le i < M} w_i a_{i1}}.$$

It should be noted that the zero order solution, which is to take a simple weighted average of $x^*_i$, has some disadvantages. For instance, suppose the viewport contains one text region and one image region, where the image is a simple block graphic or logo (e.g. Red Cross logo). Such an image region will have a flat scd-function because it suffers little distortion loss when scaled down (see FIG. 4). With a simple weighted average of $x^*_i$, the text scale will be altered too much and the text viewing experience is compromised; while the image scale is also altered but the image viewing experience is not compromised (little distortion change). On the other hand, with the first order solution given by the formula above in which flat scd-function terms have negligible contributions, the whole text and image combination will be more legible.

It should also be noted that the inventive method is not limited to this specific embodiment and that other types of scd-functions, weights, and solutions can be used.

Viewer Module

In one embodiment, the inventive CBAZ viewer module 510 shown in FIG. 5 is a plug-in or an application that can handle the content transferred or transmitted from the application server or service provider 508 hosting the CBAZ core module 511. In an embodiment of the invention, the viewer module 510 supports basic viewport navigation interactions, and is configured render images at different scales or an image bundle consisting of different resolution images.

A prototype of the inventive CBAZ viewer has been built in Java and has been simulated on a desktop PC, as shown in FIG. 3. In an embodiment of the invention, the viewer includes an option to let the user set the basic zoom level. The aforesaid basic zoom level is applied to every region by adjusting their scale-distortion functions. This helps to customize the size of text and graphics to an individual user's preference.

Exemplary Computer Platform

Figure 9:
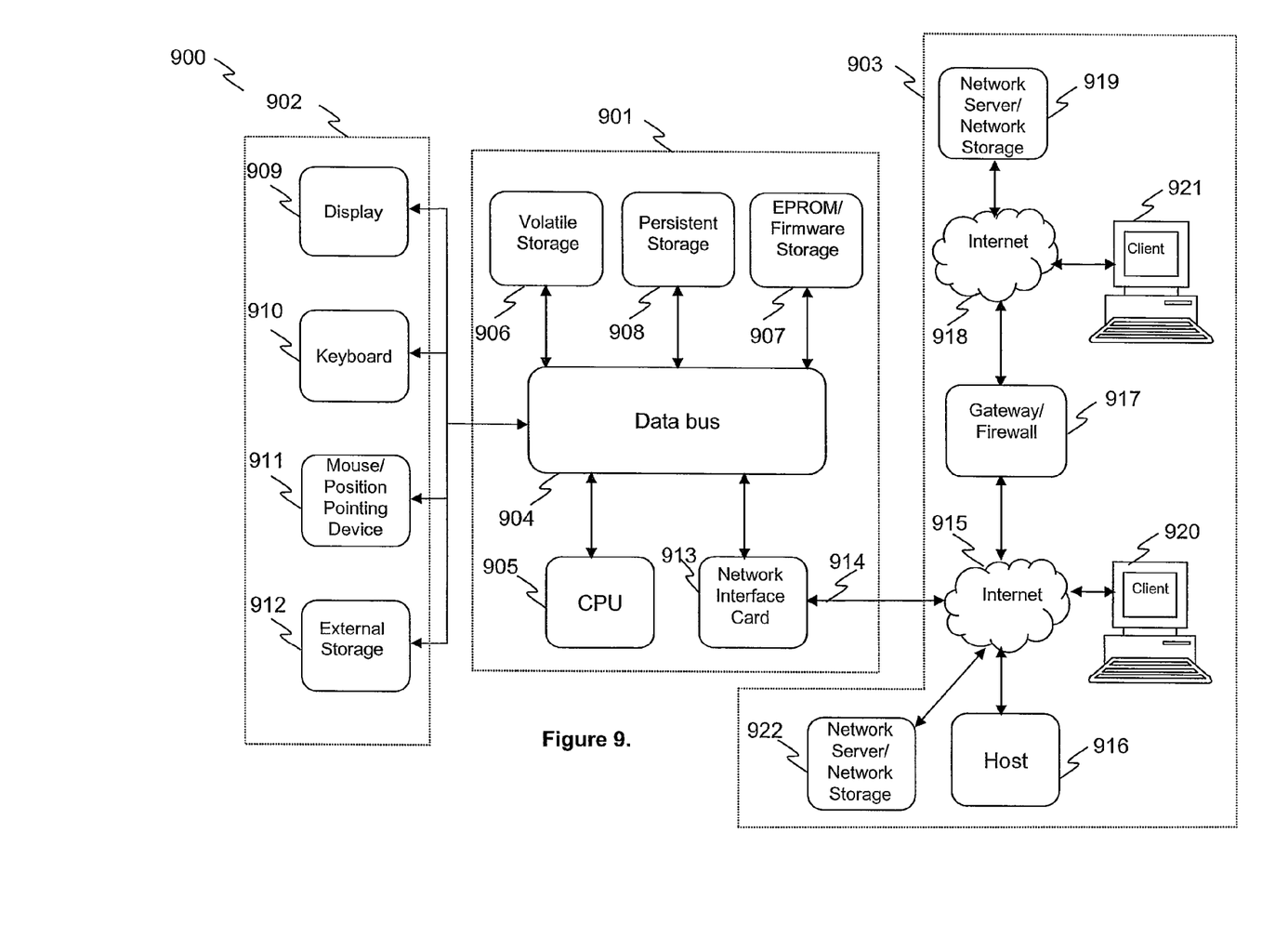
FIG. 9 illustrates an exemplary embodiment of a computer platform upon which the inventive system may be implemented.

FIG. 9 is a block diagram that illustrates an embodiment of a computer/server system 900 upon which an embodiment of the inventive methodology may be implemented. The system 900 includes a computer/server platform 901, peripheral devices 902 and network resources 903.

The computer platform 901 may include a data bus 904 or other communication mechanism for communicating information across and among various parts of the computer platform 901, and a processor 905 coupled with bus 901 for processing information and performing other computational and control tasks. Computer platform 901 also includes a volatile storage 906, such as a random access memory (RAM) or other dynamic storage device, coupled to bus 904 for storing various information as well as instructions to be executed by processor 905. The volatile storage 906 also may be used for storing temporary variables or other intermediate information during execution of instructions by processor 905. Computer platform 901 may further include a read only memory (ROM or EPROM) 907 or other static storage device coupled to bus 904 for storing static information and instructions for processor 905, such as basic input-output system (BIOS), as well as various system configuration parameters. A persistent storage device 908, such as a magnetic disk, optical disk, or solid-state flash memory device is provided and coupled to bus 901 for storing information and instructions.

Computer platform 901 may be coupled via bus 904 to a display 909, such as a cathode ray tube (CRT), plasma display, or a liquid crystal display (LCD), for displaying information to a system administrator or user of the computer platform 901. An input device 910, including alphanumeric and other keys, is coupled to bus 901 for communicating information and command selections to processor 905. Another type of user input device is cursor control device 911, such as a mouse, a trackball, or cursor direction keys for communicating direction information and command selections to processor 904 and for controlling cursor movement on display 909. This input device typically has two degrees of freedom in two axes, a first axis (e.g., x) and a second axis (e.g., y), that allows the device to specify positions in a plane.

An external storage device 912 may be connected to the computer platform 901 via bus 904 to provide an extra or removable storage capacity for the computer platform 901. In an embodiment of the computer system 900, the external removable storage device 912 may be used to facilitate exchange of data with other computer systems.

The invention is related to the use of computer system 900 for implementing the techniques described herein. In an embodiment, the inventive system may reside on a machine such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 908. Volatile media includes dynamic memory, such as volatile storage 906. Transmission media includes coaxial cables, copper wire and fiber optics, including the wires that comprise data bus 904. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on the data bus 904. The bus 904 carries the data to the volatile storage 906, from which processor 905 retrieves and executes the instructions. The instructions received by the volatile memory 906 may optionally be stored on persistent storage device 908 either before or after execution by processor 905. The instructions may also be downloaded into the computer platform 901 via Internet using a variety of network data communication protocols well known in the art.

The computer platform 901 also includes a communication interface, such as network interface card 913 coupled to the data bus 904. Communication interface 913 provides a two-way data communication coupling to a network link 914 that is connected to a local network 915. For example, communication interface 913 may be an integrated services digital network (ISDN) card or a modem to provide a data communication connection to a corresponding type of telephone line. As another example, communication interface 913 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 913 sends and receives electrical, electromagnetic or optical signals that carry digital data streams representing various types of information.

Network link 913 typically provides data communication through one or more networks to other network resources. For example, network link 914 may provide a connection through local network 915 to a host computer 916, or a network storage/server 917. Additionally or alternatively, the network link 913 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local area network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 914 and through communication interface 913, which carry the digital data to and from computer platform 901, are exemplary forms of carrier waves transporting the information.

Computer platform 901 can send messages and receive data, including program code, through the variety of network(s) including Internet 918 and LAN 915, network link 914 and communication interface 913. In the Internet example, when the system 901 acts as a network server, it might transmit a requested code or data for an application program running on client(s) 920 and/or 921 through Internet 918, gateway/firewall 917, local area network 915 and communication interface 913. Similarly, it may receive code from other network resources.

The received code may be executed by processor 905 as it is received, and/or stored in persistent or volatile storage devices 908 and 906, respectively, or other non-volatile storage for later execution. In this manner, computer system 901 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive information display system. It is intended that the specification and examples be considered as exemplary only, with a true scope and spirit of the invention being indicated by the following claims.

What is claimed is:

1. A method comprising:
   segmenting a document into a plurality of regions;
   performing an image analysis for each of the plurality of regions;
   computing a scale-distortion function for each of the plurality of regions using the image analysis;
   displaying a viewport of the document on a display so that at least two of the plurality of regions are visible at a same time within the viewport;
   computing a viewport scale, by use of a processor, according to the scale-distortion functions of the at least two of the plurality of regions that are visible at the same time within the viewport; and automatically adjusting a zoom of the viewport based on the computed viewport scale.

2. The method of claim 1, wherein the optimizing is based on a first order solution.

3. The method of claim 1, wherein the scale-distortion function is computed based, at least in part, on a content property, the content property being based on a font size.

4. The method of claim 3, wherein the font size is determined by analyzing a bitmap image in the document or by obtaining the font size directly from a specification of the document.

5. The method of claim 1, wherein the scale-distortion function is computed based, at least in part, on a content property, the content property comprising a luminance, a color value, a texture value, or an image feature.

6. The method of claim 1, wherein the document comprises a scanned bitmap image.

7. The method of claim 6, wherein segmenting the document is performed by analyzing pixels of the bitmap image to find connected components and clusters to determine the plurality of regions.

8. The method of claim 1, further comprising classifying each of the plurality of regions as being one of a text region and a graphics region by analyzing corresponding image features in the each of the plurality of regions.

9. The method of claim 8, further comprising, for each text region, determining a font size by detecting line groupings, character objects, or optical character recognition.

10. The method of claim 1, wherein the document comprises an electronic data file containing at least one of a document content or a metadata.

11. The method of claim 10, wherein the segmenting is performed by using the document content or the metadata.

12. The method of claim 10, further comprising classifying each of the plurality of regions as being one of a text region and a graphics region by using the document content or the metadata.

13. The method of claim 12, further comprising, for each text region, determining a font size by using the document content or the metadata.

14. The method of claim 1, wherein the plurality of regions comprises a text region, and
wherein a cutoff value of the scale-distortion function of the text region is computed by using an estimated font size of the text region.

15. The method of claim 1, wherein the plurality of regions comprises a graphics region, and
wherein a cutoff value of the scale-distortion function of the graphics region is computed by analyzing image features of the graphics region, the image features comprising texture, energy, or entropy.

16. The method of claim 1, wherein the plurality of regions comprises a graphics region including at least one face, and
wherein a cutoff value of the scale-distortion function of the graphics region is computed by applying an automatic face detection algorithm to extract a bounding box of the at least one face.

17. The method of claim 1, wherein the adjusting further comprises calculating an overall zoom factor for the displayed region based on the optimizing.

18. The method of claim 1, further comprising, in response to the viewport being moved, re-computing the viewport scale and automatically adjusting the zoom of the viewport based on the re-computed viewport scale.

19. A non-transitory computer readable medium embodying a set of instructions, the set of instructions, when executed by one or more processors, causing the one or more processors to perform a method comprising:
segmenting a document into a plurality of regions;
performing an image analysis for each of the plurality of regions;
computing a scale-distortion function for each of the plurality of regions using the image analysis; and
displaying a viewport of the document on a display so that at least two of the plurality of regions are visible at a same time within the viewport;
computing a viewport scale, by use of a processor, according to the scale-distortion functions of the at least two of the plurality of regions that are visible at a same time within the viewport; and
automatically adjusting a zoom of the viewport based on the computed viewport scale.

20. A system comprising:
a segmentation module operable to segment a document into a plurality of regions;
an image analysis module operable to perform an image analysis for each of the plurality of regions;
a display operable to display a viewport of the document so that at least two of the plurality of regions are visible at a same time within the viewport; and
a computing module operable to:
compute a scale-distortion function for each of the plurality of regions using the image analysis;
compute a viewport scale according to the scale-distortion functions of the at least two of the plurality of regions that are visible at a same time within the viewport; and
automatically adjust a zoom of the viewport based on the computed viewport scale.

21. The system according to claim 20, wherein in response to the viewport being moved, the computing module re-computes the viewport scale and automatically adjusting the zoom of the viewport based on the re-computed viewport scale.

* * * * *